(12) United States Patent
Collard et al.

(10) Patent No.: US 10,337,578 B2
(45) Date of Patent: Jul. 2, 2019

(54) SUSPENSION ELEMENT FOR THE MECHANICAL ATTACHMENT OF A LOAD SUSPENDED WITHIN A MOUNT

(71) Applicant: THALES, Courbevoie (FR)

(72) Inventors: Eric Collard, Elancourt (FR); Fabrice Tardif, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/762,115

(22) PCT Filed: Jan. 17, 2014

(86) PCT No.: PCT/EP2014/050921
§ 371 (c)(1),
(2) Date: Oct. 23, 2015

(87) PCT Pub. No.: WO2014/111534
PCT Pub. Date: Jul. 24, 2014

(65) Prior Publication Data
US 2016/0146282 A1    May 26, 2016

(30) Foreign Application Priority Data

Jan. 18, 2013    (FR) .................................... 13 00105

(51) Int. Cl.
*F16F 3/12*    (2006.01)
*F16F 1/32*    (2006.01)

(52) U.S. Cl.
CPC ................ *F16F 1/326* (2013.01); *F16F 3/12* (2013.01)

(58) Field of Classification Search
CPC ...... F16F 3/12; F16F 1/326; F16F 7/10; F16F 7/116; F16F 15/1213; H02G 7/14; Y10T 74/2128; G01V 1/181
USPC ............ 267/136, 140.4, 140.5, 141.1, 141.2
See application file for complete search history.

(56) References Cited

U.S. PATENT DOCUMENTS

| | | | | |
|---|---|---|---|---|
| 1,720,545 A | * | 7/1929 | Dickey .................. | B60G 11/42 174/184 |
| 2,482,330 A | * | 9/1949 | Dudzinski .............. | B22C 7/065 164/410 |
| 3,269,717 A | * | 8/1966 | Beck ....................... | F16F 1/373 267/141 |
| 3,462,136 A | * | 8/1969 | Rumsey .................. | F16F 1/326 188/268 |
| 3,718,900 A | * | 2/1973 | Holmes, Jr. ............ | G01V 1/181 267/161 |
| 4,044,628 A | * | 8/1977 | Jacks .................. | F16F 15/1213 188/268 |

(Continued)

FOREIGN PATENT DOCUMENTS

DE    196 10 692 A1    9/1997
EP    0 535 628 A1    4/1993

*Primary Examiner* — Thomas W Irvin
(74) *Attorney, Agent, or Firm* — Baker & Hostetler LLP

(57) ABSTRACT

A suspension element for the mechanical connection of a load which is suspended in a support, having a rigidity. It comprises at least two mechanical interfaces with the load and with the support, respectively, and at least two plates which connect each of the two interfaces in a complete connection, the rigidity of the element being adjusted to specific values along three orthogonal axes in accordance with the number of plates, their distribution between the interfaces and their dimensions in terms of length, thickness and depth.

14 Claims, 6 Drawing Sheets

(56) References Cited

U.S. PATENT DOCUMENTS

| | | | | |
|---|---|---|---|---|
| 4,145,936 A * | 3/1979 | Vincent | B64C 27/001 | 416/500 |
| 4,225,287 A * | 9/1980 | Vincent | B64C 27/001 | 416/145 |
| 4,238,845 A * | 12/1980 | Haggard | G01V 1/181 | 267/161 |
| 4,323,994 A * | 4/1982 | Coogler | G01V 1/181 | 267/158 |
| 4,400,861 A * | 8/1983 | Parker | B21D 28/06 | 148/518 |
| 4,458,344 A * | 7/1984 | Coogler | G01V 1/181 | 267/161 |
| 4,623,991 A * | 11/1986 | Vitringa | G01V 1/181 | 267/161 |
| 4,685,094 A * | 8/1987 | Vitringa | G01V 1/182 | 188/380 |
| 4,711,610 A * | 12/1987 | Riehl | B23Q 11/0035 | 269/21 |
| 4,795,012 A * | 1/1989 | Durum | F16D 3/52 | 192/207 |
| 5,134,593 A * | 7/1992 | Logan | G01V 1/181 | 267/141.3 |
| 5,134,594 A * | 7/1992 | Woo | G01V 1/181 | 267/161 |
| 5,147,246 A * | 9/1992 | Focqueur | F16F 15/1213 | 192/207 |
| 5,234,376 A * | 8/1993 | Chimner | F16F 15/16 | 192/207 |
| 5,358,210 A | 10/1994 | Simon et al. | | |
| 5,435,532 A * | 7/1995 | Ihle | B60K 13/04 | 267/140.4 |
| 5,555,222 A * | 9/1996 | Woo | G01V 1/181 | 267/161 |
| 5,884,892 A * | 3/1999 | Gassen | F16F 1/387 | 248/635 |
| 6,127,750 A * | 10/2000 | Dadd | H02K 33/16 | 310/13 |
| 6,296,572 B1 * | 10/2001 | Kimura | F16D 3/52 | 192/84.961 |
| 6,419,214 B2 * | 7/2002 | Palinkas | B60G 21/0551 | 248/635 |
| 6,916,017 B2 * | 7/2005 | Noe | H02K 41/0356 | 188/267 |
| 7,194,905 B2 * | 3/2007 | Yamamoto | F16F 1/326 | 73/493 |
| 7,232,017 B2 * | 6/2007 | Minor | F16F 7/015 | 174/42 |
| D658,681 S * | 5/2012 | Takemori | D15/7 | |
| 8,176,809 B2 * | 5/2012 | Ihrke | B25J 17/0241 | 267/161 |
| 8,714,051 B2 * | 5/2014 | Dopke | F16F 15/315 | 123/192.1 |
| 8,734,043 B2 * | 5/2014 | Jeandot | B64G 1/66 | 403/111 |
| 8,845,202 B2 * | 9/2014 | Teimel | F16C 25/083 | 384/517 |
| 9,285,073 B2 * | 3/2016 | Ellis | F16F 1/324 | |
| 2005/0184601 A1 | 8/2005 | Kweon et al. | | |
| 2007/0041856 A1 * | 2/2007 | Hansen | F04B 49/14 | 417/417 |
| 2007/0257569 A1 | 11/2007 | Heyder | | |
| 2014/0241911 A1 * | 8/2014 | Roman | F04B 35/045 | 417/328 |
| 2016/0102724 A1 * | 4/2016 | Potter | F16F 1/027 | 267/161 |

\* cited by examiner

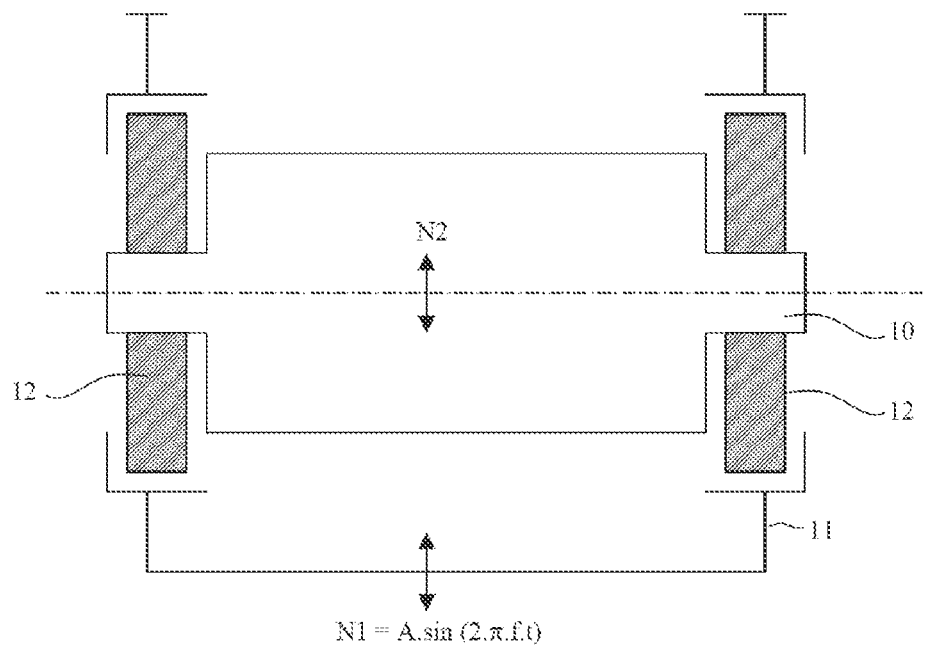
FIG 1.A
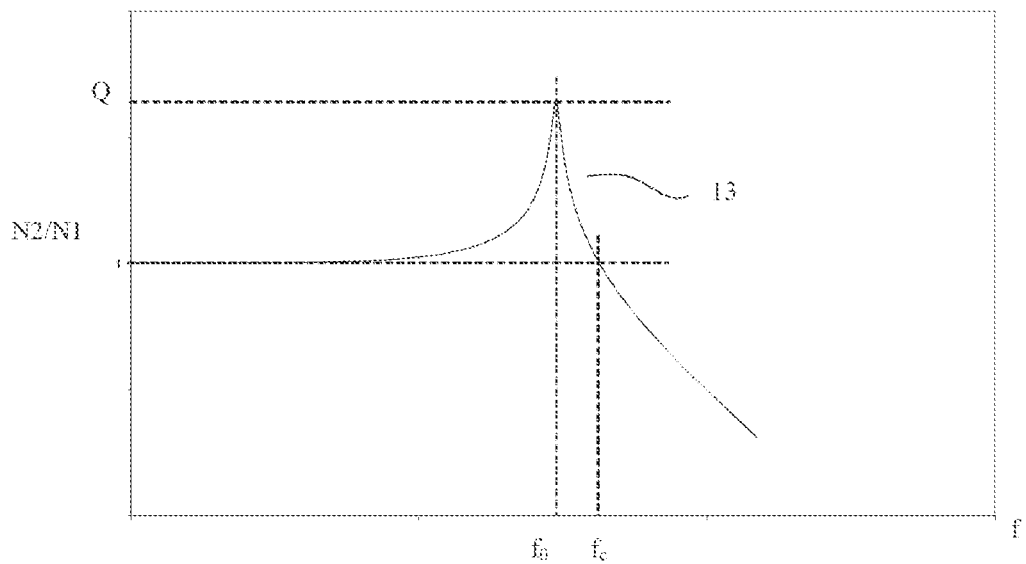
FIG 1.B

SUSPENSION ELEMENT FOR THE MECHANICAL ATTACHMENT OF A LOAD SUSPENDED WITHIN A MOUNT

CROSS-REFERENCE TO RELATED APPLICATIONS

This application is a National Stage of International patent application PCT/EP2014/050921, filed on Jan. 17, 2014, which claims priority to foreign French patent application No. FR 1300105, filed on Jan. 18, 2013, the disclosures of which are incorporated by reference in their entirety.

FIELD OF THE INVENTION

The present invention relates to a suspension element for the mechanical connection of a load which is suspended in a support. It applies notably to the suspension of material which requires very good performance levels in terms of vibration isolation.

BACKGROUND

In the field of airborne equipment, for example, notably equipment of the optical bench or suspended radar type, the vibration environment is generated by vibrations transmitted by the carrier airplane and the aerodynamic turbulence on the exterior structure of the equipment. The current solution for vibration isolation of the structure of airborne equipment uses passive dampers of elastomer material. FIGS. 1A and 1B illustrate the diagram of a load 10 suspended in a rigid support 11 using a mechanical connection comprising two suspension elements 12 of the elastomer damper type and a line 13 which shows at a logarithmic scale the rate of the modulus of the transfer function which is associated with this connection in accordance with the excitation frequency f. The line 13 is obtained, for example, by taking the ratio between the acceleration amplitudes $N_2/N_1$ of the load ($N_2$) and the support ($N_1$), respectively, when it is subjected to a sinusoidal excitation of specific acceleration amplitude A and frequency amplitude f. The line 13 shows that, at low frequency, the modulus of the transfer function is equal to 1, that is to say that $N_2$ and $N_1$ have a similar movement, then, for a specific frequency $f_0$, called the resonance frequency, the transfer function has a maximum value Q, called an overload value. The resonance frequency value is linked substantially to the rigidity of the connection and the value of the overload is linked to the damping. A connection with little damping has a high overload value and the value of the resonance frequency is even smaller when the rigidity is low (at a specific load mass). Above a frequency value $f_c$ called the cut-off frequency, a filtering of the vibrations can be seen (transfer function less than 1).

The main disadvantages encountered nowadays with this type of connection which uses elastomer dampers include in particular significant variations in performance levels (rigidity, damping) in accordance with the temperature and vibration amplitudes and frequencies resulting from the non-linearities of the elastomer material, a dispersion of the rigidities of the dampers from one production to another, bringing about significant residual rotations of the suspended equipment, and a possibility of creep of the suspension element after application of thermal cycles or vibration or static acceleration bringing about a modification of the relative position of the load relative to the support. These disadvantages are amplified by the anisotropy of the rigidity of the suspension element constituted in this manner.

SUMMARY OF THE INVENTION

The present invention proposes an original structure of the suspension element which enables there to be ensured, according to a specific embodiment, a rigidity isotropy greater than 10% and which generally allows the rigidity to be adjusted to specific values in the three dimensions, independently. A suspension element which filters the vibrations is obtained.

To this end, the invention proposes a suspension element for the mechanical connection of a load which is suspended in a support, having a rigidity. It is principally characterized in that it comprises at least two mechanical interfaces with the load and with the support, respectively, and at least two plates which connect each of the two interfaces in a complete connection, the rigidity of the element being adjusted to specific values along three orthogonal axes in accordance with the number of plates, their distribution between the interfaces and their dimensions in terms of length, thickness and depth.

Advantageously, the plates are distributed between the interfaces with a cyclic symmetry, which enables isotropic adjustment of the rigidity.

Advantageously, the structure formed by the interfaces and the plates is of metal and the suspension element according to the invention further comprises at least one damping element which is positioned between two plates and/or between a plate and a mechanical interface, which enables the characteristics of stable and linear rigidity of a metal material to be associated with the damping characteristics of a material of the elastomer type.

BRIEF DESCRIPTION OF THE DRAWINGS

Other advantages and features will be appreciated more clearly from a reading of the following description, illustrated by the appended Figures, in which:

FIGS. 1A and 1B show the diagram of a connection with two suspension elements and a line which provides the function for transfer of the suspension (already described);

In these Figures, identical elements are given the same reference numerals.

DETAILED DESCRIPTION

Figures 2A, 2B:
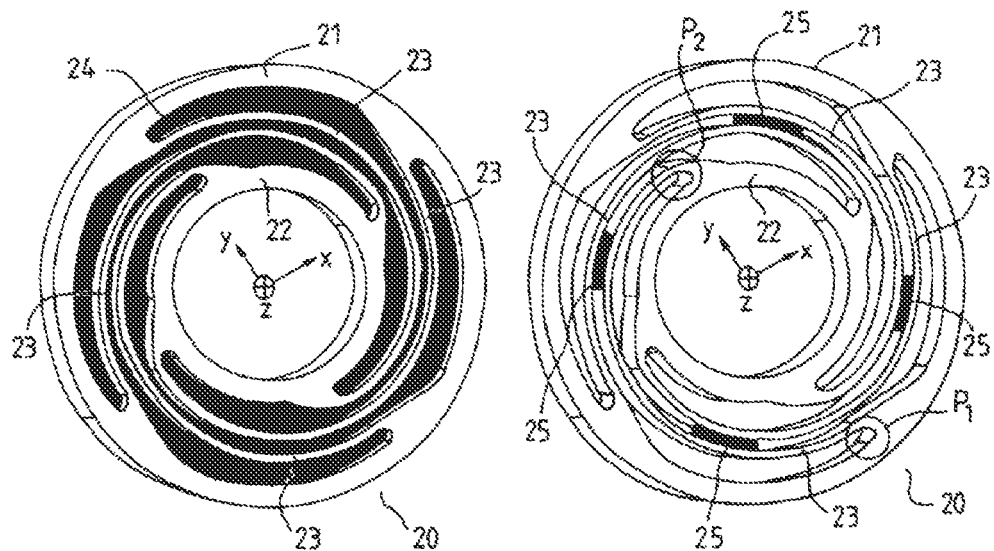
FIGS. 2A and 2B show two first examples of a suspension element according to the invention having a planar structure.
Figure 3:
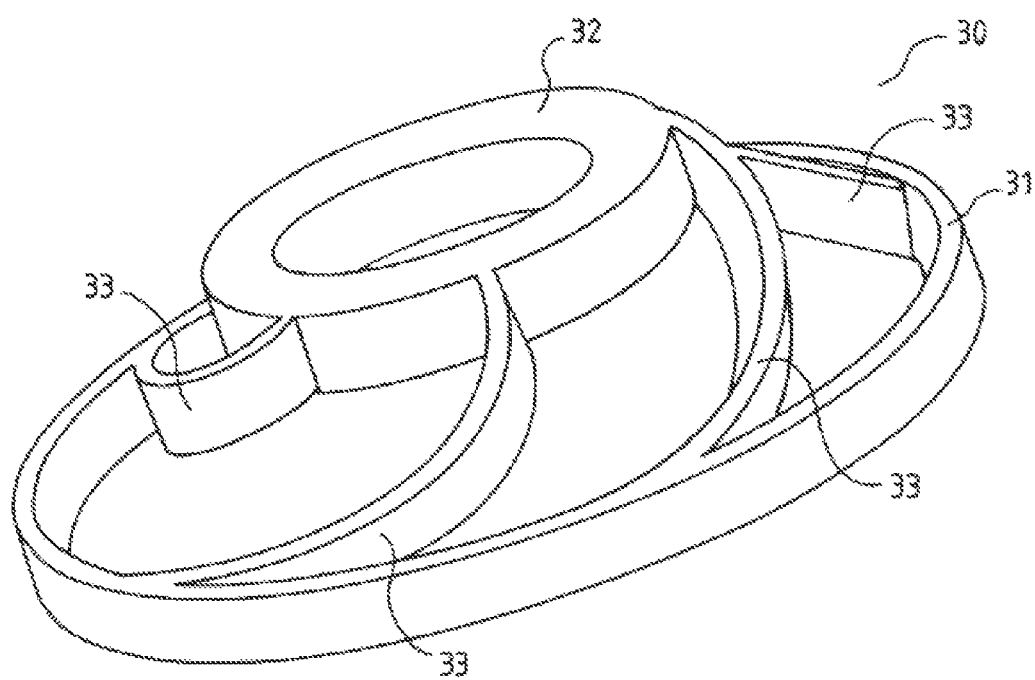
FIG. 3 shows an example of a suspension element according to the invention having a three-dimensional structure.
Figure 6:
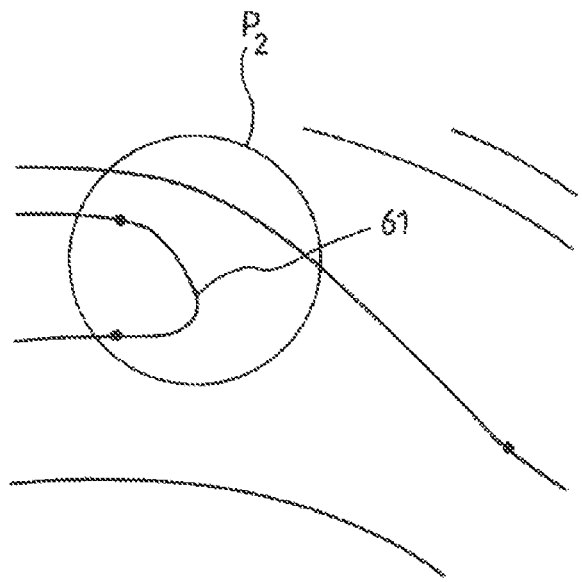
FIG. 6 shows a diagram showing a fillet between a plate and an interface.

FIGS. 2A, 2B and 3 show production examples of a suspension element for the mechanical connection of a load which is suspended in a support according to the invention.

In the examples illustrated in FIGS. 2A and 2B, the suspension element 20 comprises two mechanical interfaces 21 and 22 with the load and with the support (not illustrated), respectively. For example, the load is connected to the internal interface 22 and the support is connected to the external interface 21. The reverse is also possible. According to this example, the interfaces are concentric which simplifies design and production. According to the invention, the suspension element comprises at least two plates 23 which connect each of the two interfaces 21 and 22 in a complete connection. The plates are connected by connection locations, two of which are indicated in FIG. 2B ($P_1$ and $P_2$ for the connection locations to the interfaces 21 and 22, respectively). In these examples, the structure formed by the interfaces and the plates is planar, and therefore particularly easy to produce. However, other structural forms are possible. In this manner, the example of FIG. 3 shows a suspension element 30 in which the interfaces form a three-dimensional structure with the plates. This variant may be advantageous for overcoming specific problems of spatial requirement or interfaces. It is possible to see in FIG. 3 concentric mechanical interfaces 31 and 32, plates 33 connecting the interfaces in a complete connection.

In these examples, the mechanical interfaces are circular rings which are simple to produce. However, other types of interfaces may be envisaged according to the geometries of the load and the support. It is sufficient for them to be adapted to the arrangement of the plates. Advantageously, the interfaces form with the plates a homogeneous structure which is produced from a material which has a high rigidity linearity, for example, a metal structure of the steel type. Other materials may be envisaged, of the composite material type. For reasons of production cost and better resistance, the structure is preferably monolithic, that is to say, produced in one piece, for example, by means of milling.

As a result of this original architecture of the suspension element, the Applicant has shown that it is possible by means of appropriate sizing of the plates and a distribution thereof between the interfaces to adjust the rigidity of the suspension element to specific values along three orthogonal axes, two radial axes designated X and Y, and an axial axis designated Z in FIGS. 2A and 2B. The adjustment may be carried out independently along the three axes. The fact of being able to adjust the rigidity in the three dimensions may have a number of advantages in a large number of applications. For example, it may be advantageous to have a more rigid suspension along an axis (radial or axial) to compensate for a higher impact or vibration level in order to limit the displacement or to be able to better decouple the frequency of the suspension in an axis with that of the portion suspended in the same axis. According to the invention, the control of the rigidity is carried out by means of sizing of the plates, that is to say, their number, their length, their thickness and their depth, and their distribution between the interfaces, that is to say, their positioning one relative to the other. In the case of concentric interfaces, the length is given, for example, as the number of turns between their two connection locations $P_1$, $P_2$ (FIG. 2B) at the interfaces, the thickness corresponds to the radial dimension and the depth at the axial dimension. The application of a method of the analytical type using the theory of the resistance of the materials in a thin layer (hypothesis relating to a material of small thickness compared with the length) or in a thick layer allows the plates to be sized. This sizing is also possible using a simulation method with finite elements of the suspension element.

Figure 4:
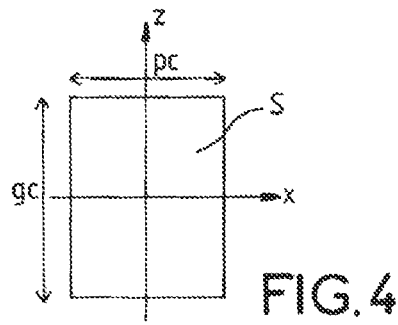
FIG. 4 shows the diagram of a rectangular cross-section S of a plate of the suspension element according to the invention.

The Applicant has shown that it is necessary to have at least two plates in the suspension element according to the invention in order to be able to adjust the rigidity along the three axes. Notably, the Applicant has shown that the adjustment of the axial rigidity (along the Z axis) relative to the radial rigidity is dependent on the depth of the plates and more particularly on the value of the depth compared with that of the thickness. In this manner, in the example of plates having a cross-section which has a short side and a long side, for example, a cross-section of the rectangular type, as is the case in the embodiments of FIGS. 2A, 2B and 3, the value of the axial rigidity relative to the radial rigidity is dependent on the pc/gc ratio between the short side pc and the long side gc of the cross-section. FIG. 4 shows the cross-section S of a plate which corresponds to a section along a radial axis. The short side (pc) corresponds to the thickness of the plate, the long side (gc) to the depth thereof. This observation is also valid for other shapes of cross-section (elliptical, trapezoidal, etcetera).

Figure 5:
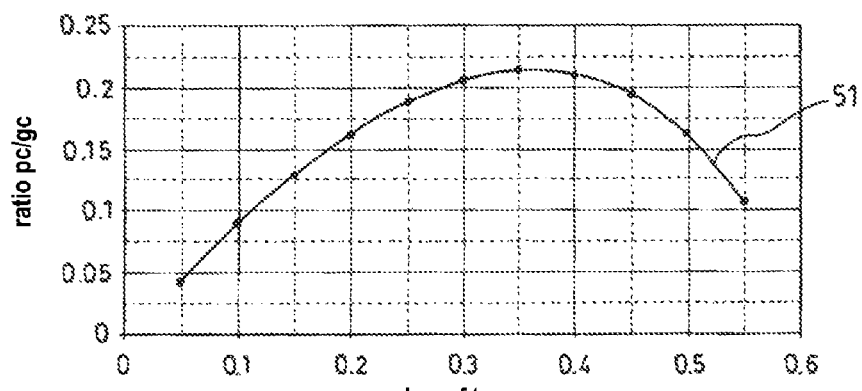
FIG. 5 shows a line providing as a function of the length of the plates the optimal characteristics of the cross-section of the plates in order to ensure the isotropy.

According to a specific application example, it is possible to seek to obtain a rigidity isotropy, that is to say, a rigidity which is substantially equal along the three axes X, Y, Z. The Applicant has shown that the isotropy can be obtained by the arrangement of at least two plates, and preferably at least three, distributed between the interfaces in accordance with a cyclic symmetry, as is the case in the examples of FIGS. 2A, 2B and 3. A specific example of sizing of the plates which enables an isotropy of the rigidity to be obtained at a level greater than 10% in an example of a suspension element having a planar structure as illustrated in FIGS. 2A and 2B is given by the line of FIG. 5. The Applicant has shown that, in the case of a planar structure, the isotropy can be obtained by adjusting the pc/gc ratio in accordance with the value of the length of the specific plate given in terms of the number of turns v. The line 51 thus shows, for different values of length v of the plates, the pc/gc ratio which it is necessary to select in order to obtain the isotropy. This line is obtained by plates having a curved form, with a continuous curvature of the helical type. For example, in the case of FIGS. 2A and 2B, the length of the plates is approximately 0.5 of a turn between their connection locations with respect to the interfaces, designated $P_1$ and $P_2$. In this manner, in the example of FIG. 5, the pc/gc ratio is between 0.1 and 0.2, around 0.16. Such a configuration provides very good rigidity isotropy of the suspension element at a level greater than 2%.

In the example of FIGS. 2A and 2B, the suspension element has four plates which are distributed in accordance with a cyclic symmetry and which have a curved form with continuous curvature, for example, in a helical form. This arrangement is particularly advantageous to address both the problems of spatial requirement between the two interfaces and to make the stress level of the structure minimal. The selection of an adequate plate length (in this instance, 0.5 turns) enables the maximum stresses observed to be reduced. In the same manner, it is possible to select a larger number of plates in order to reduce the level of stresses whilst ensuring that there is no interference between the plates in the displacement ranges of the suspension element.

The Applicant has also shown that a suitable form of the joints between the plates and the interfaces enables the concentrations of stresses to be reduced very significantly. Such a joint, designated $P_1$ or $P_2$ in FIG. 2B, is shown in FIG.

6. According to this variant, the fillet 61 (inner form of the connection) has continuity of curvature, which avoids the concentrations of stresses inside the fillet, which is a source of cracks.

According to a particularly advantageous variant of the invention, the suspension element further comprises at least one damping element which enables a suspension element to be produced with rigidity and damping. The combination of a structure of the metal type with very good rigidity linearity and rigidity controlled in the three dimensions, as has been described above, with a damping element, has numerous advantages compared with the suspension elements of the prior art, and more specifically the suspension elements of elastomer material. Notably, the variations of the performance levels (rigidity, damping) in accordance with the temperature, the vibration amplitudes and frequencies are reduced, the dispersion of the rigidity levels of the dampers from one production to another which would bring about significant residual rotations of the suspended equipment is also reduced, as is the relative position variation between the load relative to the support resulting from the creep of the suspension element after the application of thermal or vibratory or static acceleration cycles. In the case of suspended loads which are intended to be airborne, the suspension element according to the invention enables the limitation of displacement in terms of landing/catapulting impact resulting from the significant reduction of the rigidity of the elastomer material for this type of loading. Furthermore, the static rigidity of the metal is identical to the dynamic rigidity thereof, which prevents excessively great displacement under a load factor.

It should be noted that the damping element also provides rigidity and the sizing of the suspension element has to take into account both the structure formed from the plates and the interfaces and the damping element in order to control the rigidity along the three axes and notably to obtain a rigidity isotropy.

FIGS. 2A and 2B show two embodiments of suspension elements which combine controlled rigidity and damping. In the example of FIG. 2A, the damping element is formed by a web 24 of elastomer material which fills all the gaps between the plates and the plates and the interfaces. In the example of FIG. 2B, the suspension element comprises a plurality of damping elements which are formed by studs of elastomer material and which are positioned between the plates and/or between a plate and an interface. Advantageously, in the case of a suspension element in which a rigidity isotropy is sought, it is possible to provide for at least as many studs as plates, also distributed in accordance with a cyclic symmetry, in order to retain the rigidity isotropy, as is the case in the example of FIG. 2B. In this manner, in this example, 4 studs of elastomer material are provided, in a state distributed in accordance with a cyclic symmetry, and positioned substantially at 90° with respect to the connection locations of the plates.

Figure 7:
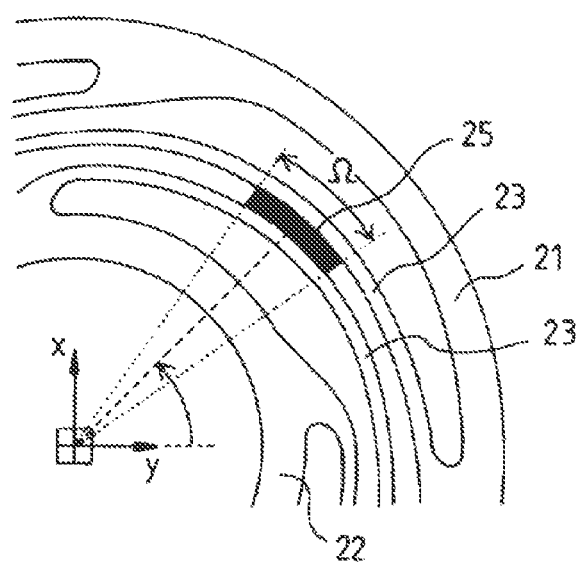
FIG. 7 shows a diagram showing the positioning and the shape of a stud of elastomer material according to an embodiment.

FIG. 7 shows a detail of the arrangement of such a stud 25. According to this example, the stud has a depth which is identical to that of the plates and a length defined by the angular opening Ω of between 20° and 30°, which enables significant damping and very good isotropy of this damping in the three dimensions to be ensured.

According to another variant, studs of elastomer material are fixed to a single plate ensuring play with respect to the opposing plate and are positioned at one side and the other of each of the studs 25 of FIG. 7, which allows the rigidity to be increased in accordance with the travel of the suspension element. This advantage enables a progressive and continuous rigidity to be obtained at the end of the travel and enables impacts to be absorbed much better than can be achieved by stops which, when used in parallel with a conventional suspension, have a high discontinuity of rigidity and not necessarily progressivity when they are loaded. For example, the studs may be placed in the region of the fillets, between the plates and the interfaces.

Other variants are possible to combine a damping element with the structure formed by the interfaces and the plates.

Figure 8:
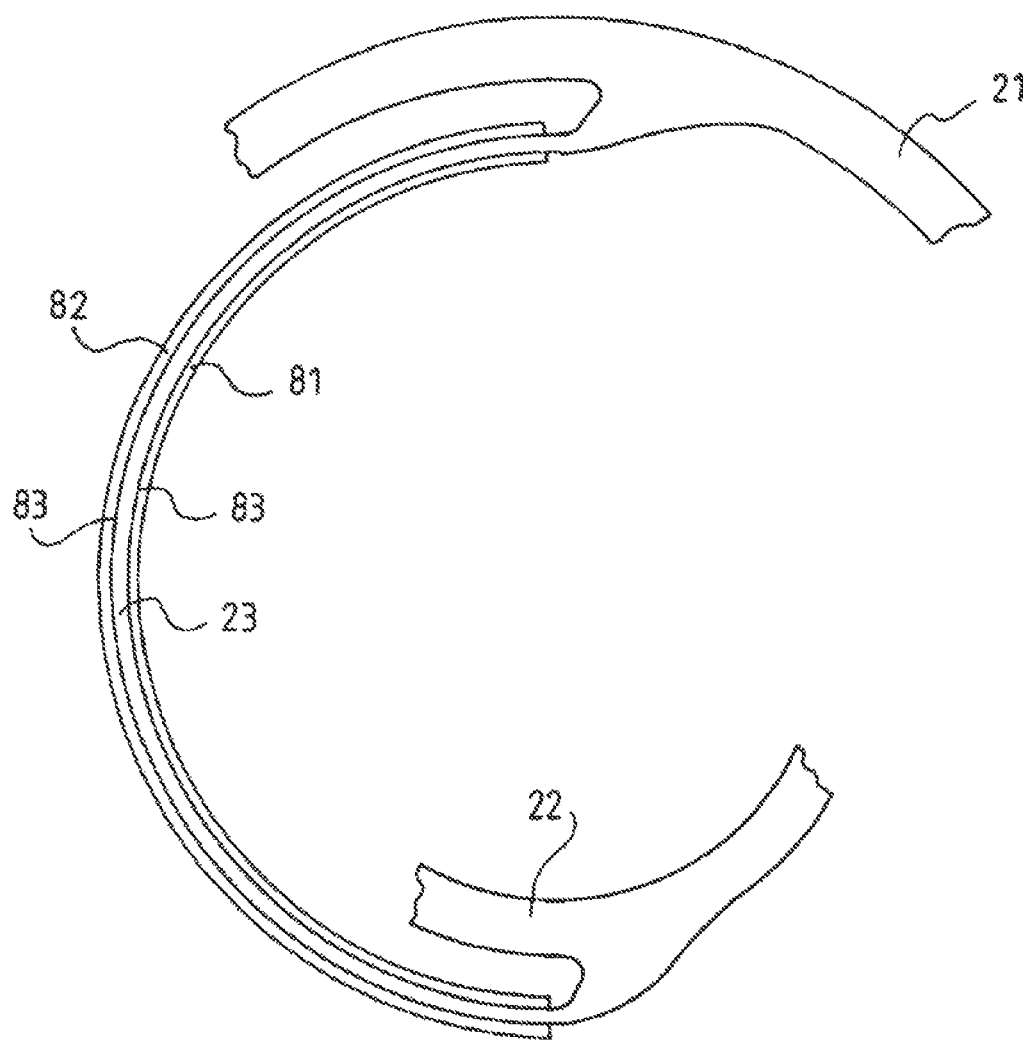
FIG. 8 shows an example of a suspension element with the damping element according to a variant.

FIG. 8 shows a first variant. In this Figure, for reasons of clarity, a single plate 23 is illustrated, this plate connecting two interfaces 21 and 22 which are partially illustrated. According to this example, two additional plates 81, 82 are adhesively bonded at one side and the other of a plate 23 which connects the two interfaces by means of an elastomer adhesive which forms a layer 83 which ensures the damping of the structure. It is also possible to provide a single additional plate which is adhesively bonded to one side of the plate 23. Advantageously, the shape of the additional plate (81, 82) conforms to that of the plate 23. Such a damping element which is produced by means of adhesively bonding an additional plate enables damping to be provided without excessive modification of the rigidity of the structure.

Figure 9A:
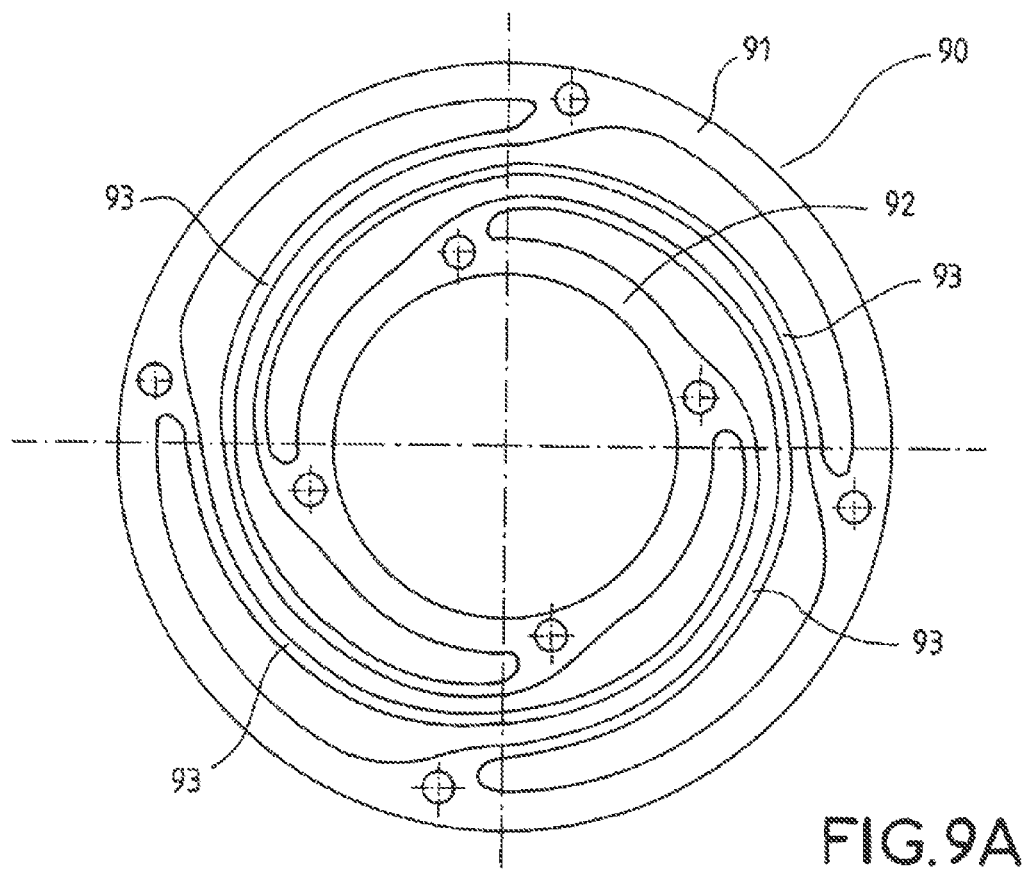
FIGS. 9A and 9B are views of another production example of a suspension element with the damping element according to the invention.
Figure 9B:
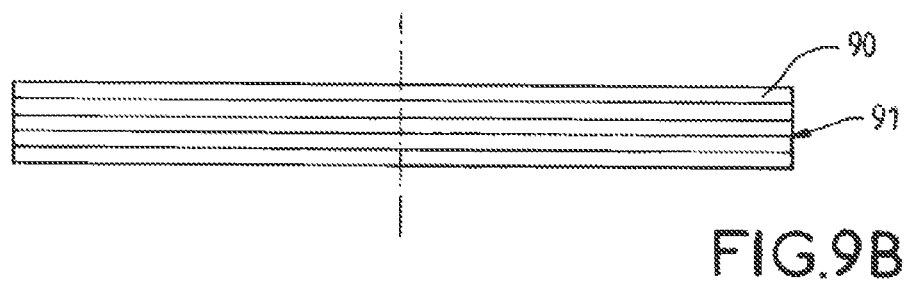

FIGS. 9A and 9B illustrate a second variant, in accordance with two views. It involves the production of a "sandwich" structure, which alternates fine, planar elementary structures which are formed by interfaces and at least two plates which connect them, as they have been described above, with layers of elastomer material, in such a manner that the suspension element obtained has at least one damping element between two plates of two adjacent elementary structures. FIG. 9A is a front view of the suspension element obtained in this manner, in accordance with an example. The shape of the elementary planar structure 90 is in this example similar to that of the structure of the suspension element of FIG. 2B, with two concentric interfaces 91, 92 and plates 93 which connect them, but the depth of the plates is in this instance only a few millimeters. In FIG. 9B, the sandwich structure is shown in accordance with a side view. In this example, five elementary structures 90 are adhesively bonded by a layer 91 of elastomer material. The sandwich structure is, for example, obtained by adhesively bonding thin metal plates to each other using elastomer adhesive then carrying out a milling operation of the assembly so as to obtain the desired shape. Another method of proceeding involves first cutting the elementary structures then adhesively bonding them with the elastomer adhesive.

The invention claimed is:

1. A suspension element configured to isolate translation and rotation vibrations in a mechanical connection of a load suspended in a support subject to said vibrations, the suspension element comprising:

at least two plates, each plate having at least two mechanical interfaces with the load and the support in a complete connection, the plates forming monolithic structures with the respective mechanical interfaces, wherein the mechanical interfaces of each plate include an internal mechanical interface and an external mechanical interface, the external mechanical interfaces are circular and configured to engage the load or the support, and a fillet of each of the plates has a continuous curvature with each of the mechanical interfaces; and at least one damping element positioned between and in fixed contact with two of the plates or between and in fixed contact with the internal and external mechanical interfaces, the at least one damping element being distributed according a cyclic symmetry, wherein the suspension element has a rigidity that is adjustable along three orthogonal axes in accordance with a number of the plates, a distribution of the plates between the mechanical interfaces, and length, thickness, and depth dimensions of the plates.

2. The suspension element as claimed in claim 1, wherein the plates are distributed in accordance with a cyclic symmetry.

3. The suspension element as claimed in claim 1, wherein the at least one damping element is formed by a stud of elastomer material.

4. The suspension element as claimed in claim 1, wherein each plate comprises a continuously curved shape between connection locations with each the mechanical interfaces.

5. The suspension element as claimed in claim 1, wherein the plates comprise a material having a high degree of rigidity linearity.

6. The suspension element as claimed in claim 5, wherein the material is a steel.

7. The suspension element as claimed in claim 1, wherein the mechanical interfaces are substantially concentric with the load and the support.

8. The suspension element as claimed in claim 1, wherein two of the mechanical interfaces comprise a planar structure.

9. The suspension element as claimed in claim 8, wherein the mechanical interfaces are substantially concentric, the suspension element comprising:

at least three plates having a curved shape with continuous curvature that connects the mechanical interfaces, the length of the plates having a number of turns between two connection locations with the mechanical interfaces being substantially identical, the plates being distributed between the mechanical interfaces in accordance with a cyclic symmetry, and wherein the plates have a cross-section having a short side and a long side, a ratio between the short side and the long side determined in accordance with the length of the plates to ensure an isotropy in terms of rigidity of the suspension element with an error less than 10%.

10. The suspension element as claimed in claim 9, wherein the cross-section has a rectangular, elliptical or trapezoidal shape.

11. The suspension element as claimed in claim 10, wherein the length of the plates is substantially equal to a half-turn and the ratio between the short side and the long side is between 0.1 and 0.2.

12. The suspension element as claimed in claim 1, wherein two of the mechanical interfaces comprise a three-dimensional structure.

13. The suspension element as claimed in claim 1, comprising an even number of mechanical interfaces, the plates and the mechanical interfaces forming a plurality of planar elementary structures, the structures being substantially identical and pressed against each other with at least one damping element located between two plates of two adjacent planar elementary structures.

14. The suspension element as claimed in claim 13, wherein the damping element comprises an elastomer material adhesively bonding the plates.

* * * * *